(12) United States Patent
Menzel et al.

(10) Patent No.: US 9,023,431 B2
(45) Date of Patent: May 5, 2015

(54) METHOD FOR COATING LIGHT ALLOY RIMS

(75) Inventors: Klaus Menzel, Ludwigshafen (DE); Erich Beck, Ladenburg (DE); Judith Pietschmann, Solothurn (CH)

(73) Assignee: BASF SE, Ludwigshafen (DE)

( * ) Notice: Subject to any disclaimer, the term of this patent is extended or adjusted under 35 U.S.C. 154(b) by 97 days.

(21) Appl. No.: 13/614,362

(22) Filed: Sep. 13, 2012

(65) Prior Publication Data

US 2013/0071576 A1 Mar. 21, 2013

Related U.S. Application Data

(60) Provisional application No. 61/536,073, filed on Sep. 19, 2011.

(51) Int. Cl.
*B05D 3/06* (2006.01)
*B05D 7/00* (2006.01)
*B05D 3/04* (2006.01)
*B05D 5/06* (2006.01)

(52) U.S. Cl.
CPC ............... *B05D 7/572* (2013.01); *B05D 7/574* (2013.01); *B05D 3/0466* (2013.01); *B05D 3/067* (2013.01); *B05D 5/06* (2013.01); *B05D 2202/25* (2013.01); *B60B 2310/614* (2013.01)

(58) Field of Classification Search
CPC ........ B05D 3/0466; B05D 3/067; B05D 5/06; B05D 7/572; B05D 7/574; B05D 2202/20; B05D 2202/25; B05D 3/065; B05D 3/066; B05D 7/14; B05D 7/24; B05D 7/56; B05D 7/57; B05D 7/586; B60B 2310/614
USPC ....................................... 427/487
See application file for complete search history.

(56) References Cited

U.S. PATENT DOCUMENTS

| | | | |
|---|---|---|---|
| 4,241,596 A * | 12/1980 | Nagatsuma et al. | ............... 72/91 |
| 5,075,370 A * | 12/1991 | Kubitza et al. | ............... 524/591 |
| 5,252,399 A | 10/1993 | Hirata et al. | |
| 5,290,625 A | 3/1994 | Eisfeller et al. | |
| 2004/0101629 A1 | 5/2004 | Baumgart et al. | |
| 2005/0079293 A1 | 4/2005 | Baumgart et al. | |
| 2005/0277732 A1 * | 12/2005 | Yu et al. | ......................... 524/589 |
| 2006/0009589 A1 | 1/2006 | Haering et al. | |
| 2006/0115602 A1 * | 6/2006 | Beck et al. | .................... 427/532 |
| 2011/0200818 A1 | 8/2011 | Djunaidi et al. | |
| 2011/0274896 A1 | 11/2011 | Krames et al. | |

FOREIGN PATENT DOCUMENTS

| | | |
|---|---|---|
| CN | 101158210 | 4/2008 |
| DE | 25 50 740 A1 | 5/1977 |
| DE | 199 57 900 A1 | 6/2001 |
| DE | 102007040376 | 2/2009 |
| DE | 10-2008-05428 3 | 6/2010 |
| DE | 10 2009 001 372 A1 | 9/2010 |
| EP | 0 464 466 A2 | 1/1992 |
| GB | 2317352 | 3/1998 |
| JP | 2001219705 A * | 8/2001 |
| WO | WO-02/38287 | 5/2002 |
| WO | WO-03/068417 | 8/2003 |
| WO | WO 2006/005491 A1 | 1/2006 |
| WO | WO-2008/070267 | 6/2008 |
| WO | WO 2010/121978 A1 | 10/2010 |
| WO | WO 2011/061314 A1 | 5/2011 |

OTHER PUBLICATIONS

PCT International Search Report in PCT/EP2012/067595, mailed Nov. 27, 2012, 6 pgs.
English Translation of Chinese Office Action in Appln. No. 201280055605X, dated Feb. 16, 2015, 4 pages.

* cited by examiner

*Primary Examiner* — Elena T Lightfoot
(74) *Attorney, Agent, or Firm* — Servilla Whitney LLC

(57) ABSTRACT

Described is a method for coating light alloy rims, coating materials for use in this method, and the coated light alloy rims obtained in this way. More specifically, described is a method for coating light alloy rims with at least three layers comprising a primer layer (A), a base coat layer (B), and a clear coat layer (C), each of which are a layer of different coating materials. The method comprises providing a substrate; applying the primer layer (A) directly to the substrate; applying the base coat (B) layer; applying the clear coat layer (C); and curing the layers of different coating materials by high-energy radiation.

9 Claims, No Drawings

METHOD FOR COATING LIGHT ALLOY RIMS

Technical Field

The present invention relates to a method for coating light alloy rims, to coating materials for use in this method, and to the coated light alloy rims obtained in this way.

Background

For coating, light alloy rims are typically primer-coated with powdercoating materials, which are applied in powder form, dried, melted at an elevated temperature to form a film, and subsequently cured.

One disadvantage associated with this coating procedure is that drying and melting necessarily involve a large amount of time, and hence conveyor length in a continuous process, and this reduces the cycle time in coating, and increases the conveyor length in a continuous process.

Another disadvantage is that drying, melting and baking of a powdercoating layer, with a thickness generally of just a fraction of a millimeter, in the oven involves the heating of the entire rim structure. For this operation, therefore, substantially more energy is expended than is necessary for the actual powdercoating layer. Furthermore, the high thermal load impacts adversely on the mechanical stability (metal microstructure), in a way which may be manifested in the development of pores or even hairline cracks in the rim structure, producing rim structures which have to be removed as rejects.

Atop the powdercoating primer, further layers (typically basecoat and clearcoat) of solventborne coating material are applied, with an organic solvent. These layers give off this solvent on drying, resulting in emissions of volatile organic compounds (VOC) and necessitating numerous workplace safety and environmental measures.

DETAILED DESCRIPTION

Provided is a method for coating light alloy rims that allows the energy and/or time consumed in drying, film formation and/or curing to be reduced and/or the use of volatile organic compounds to be reduced.

More particularly, described is a method for coating light alloy rims, in which a machined light alloy rim blank comprising a cast aluminum alloy is coated with at least three layers, comprising primer (A), base coat (B), and clear coat (C), each of which are different 35 coating materials, the primer (A) comprising at least one radiation-curable coating material having an acid number in accordance with DIN EN ISO 3682 (by potentiometry) of 10 to 120 mg KOH/g, said coating material being applied to the substrate directly, and a radiation-curable clear coat layer having a double-bond density of free-radically polymerizable reactive groups per unit mass of coating material of at least 1 mol/kg being applied to the outside of the light alloy rims, and said coating material is cured by radiation.

Curing the coating material by means of radiation, in accordance with the invention, allows a significant reduction to be made in the time needed for curing, as compared with baking.

Furthermore, it is sufficient to cure only the coating material by radiation, thereby dispensing with the energy requirement for the heating of the entire rim structure in the conventional process, and also with the thermal stress.

The light alloy substrates are generally cast aluminum alloys which as well as aluminum as the principal component include secondary amounts of silicon, minor amounts (generally well below 1% by weight) of, for example, magnesium, titanium and/or iron, and no more than traces (generally well below 0.1% by weight) of other components, examples being strontium, manganese, zinc, tin, copper, nickel, boron, calcium, sodium and/or phosphorus.

The alloys involved are preferably cast aluminum alloys with a silicon content of not more than 15% by weight, more preferably of 5% to 15% and very preferably of 5% to 13% by weight. In certain cases, wrought aluminum alloys with a silicon content of below 5% by weight are conceivable, although less preferred.

Also preferred are cast aluminum alloys with a copper content of less than 0.1%, more preferably less than 0.05%, and very preferably less than 0.03% by weight.

After casting, the blanks are generally cleaned, any cast edges and flash is removed, and they are prepared mechanically for their seating; i.e., holes are drilled for the wheel bolts (bolt-hole circle bores) and axle hub (bearing surface), the rim bed is turned, and the rims are centered.

Subsequently, in general, the surface is provided with a conversion coat: preferably, the surface is subjected to zinc phosphating or zirconium dioxide deposition, or is treated with chromium(VI) complexes, chromium(III) complexes or titanium complexes. Also conceivable are conversion coats which are free from toxic heavy metals, comprising, for example, organic silane polymers, as described in DE 10 2009 001372 A1, for example.

The machined blanks coated in this way, for example, can be introduced into the method according to the invention. In this case, preferably, the bolt-hole circle bores are at least partly masked prior to coating, so that the areas on the rims against which the wheel bolts bear remain uncoated.

In one preferred embodiment the machined blanks are coated with at least three layers, each of different coating materials.

In the case of three layers, the functions these layers take on are those of primer (A), basecoat (B), and clearcoat (C), and they are applied in this order, it being possible for each of these three layers to be applied one or more times and for the coating materials in each layer to be the same or different. Between the individual applications it is possible for the layers to be partly or fully cured, but it may also be sufficient in each case merely to carry out drying and optionally no more than partial curing, and to carry out a complete cure only at the end. Also conceivable is the application of a layer of coating material to an undried and uncured underlying layer.

In one preferred embodiment of the present invention, at least the outer-lying clearcoat layer comprises a radiation-curable coating material having free-radically polymerizable reactive groups.

In another preferred embodiment of the present invention, at least the primer comprises at least partly, preferably completely, a radiation-curable coating material having free-radically polymerizable reactive groups.

In one particularly preferred embodiment of the present invention, the light alloy rim is coated with at least two different radiation-curable coating materials having free-radically polymerizable reactive groups, and very preferably in this case the primer and clearcoat layer at least partly, preferably completely, comprise radiation-curable coating materials.

In a further particularly preferred embodiment of the present invention, the primer and the basecoat and clearcoat comprise radiation-curable coating materials.

Primer (A)

The primer layer covers preferably the entire rim apart from the bearing surface and the bolt-circle holes, with the aim of providing protection from corrosion and/or from stonechipping.

The primer (A) generally has a dry layer thickness of 100 to 200 μm, preferably 120 to 180 μm, and is constructed in turn of at least one layer, preferably of one to four, more preferably of two or three, and very preferably of three layers (A1) to (A3), each of these layers having a thickness of 20 to 100 μm, preferably of 50 to 70 μm.

As an example, a primer (A) having two to three layers (A1), (A2) and (A3) is described:

The binders in the coating materials for these layers are, in one preferred embodiment, binders which are fully radiation-curable and contain no substantial fractions of organic solvents.

The coating material for layer (A1) is preferably a radiation-curable coating material comprising (A1a) at least one radiation-curable binder, preferably selected from the group consisting of aliphatic urethane (meth)acrylates, aromatic urethane (meth)acrylates, and epoxy (meth)acrylates,
(A1b) at least one reactive diluent, and
(A1c) preferably at least one anticorrosion pigment and/or corrosion inhibitor.

In one preferred embodiment the coating material for the layer (A1) has an acid number in accordance with DIN EN ISO 3682 (by potentiometry) of at least 20 mg KOH/g, particularly preferably of at least 40 mg KOH/g. The acid number is preferably not more than 100 mg KOH/g, particularly preferably not more than 80 mg KOH/g and very particularly preferably not more than 70 mg KOH/g.

This preferred acid number allows the adhesion of the layer (A1) to the light alloy surface to be improved. It is unimportant here whether the acid number derives from component (A1a) and/or (A1b). Preferred acid groups here are carboxyl groups, phosphoric acid groups and phosphonic acid groups, preferably phosphoric acid groups or carboxyl groups.

In another preferred embodiment, the coating material for the layer (A1) has a viscosity at application temperature in accordance with DIN EN ISO 3219 (cone/plate system, shear rate 100 s$^{-1}$) of 60 to 1000 mPas, preferably of 100 to 300 mPas.

The function of the layer (A1) is to promote adhesion of the coatings on the light alloy substrate, to ensure protection from corrosion, and, by means of elasticity, to ensure protection against stonechipping.

The coating material for the layer (A2) may be composed as that for the layer (A1), but it is possible with preference to forego a particular acid number, since adhesion of the layer (A2) directly on the light alloy surface is no longer necessary, all that is necessary instead being interlayer adhesion between the layers (A1) and (A3) (if a 3rd primer layer is applied).

Accordingly, the coating material for the layer (A2) is preferably a radiation-curable coating material comprising (A2a) at least one binder selected from the group consisting of aliphatic urethane (meth)acrylates, aromatic urethane (meth)acrylates, and epoxy (meth)acrylates,
(A2b) at least one reactive diluent, and
(A2c) preferably at least one anticorrosion pigment and/or corrosion inhibitor.

Since the layers of the primer (A) in one preferred embodiment are applied to the entire surface of the rim, in other words both to the facing side and to the inside, but the layers (B) and (C) are applied only to the facing side, the primer represents the sole coating on the inside of the rim.

Consequently, for the inside of the rims, the layer (A2) or (A3) of the primer (A) represents the sole protective layer against the influence of, for example, oil, gasoline, brake fluid or rim cleaner, and ought to have a corresponding chemical resistance, as typically specified in the VDA [German Automakers Association] Guidelines 621-415.

The coating material for the layer (A3) may preferably have a composition as follows:
(A3a) at least one binder selected from the group consisting of epoxy, polyester or urethane (meth)acrylates and
(A3b) at least one reactive diluent.

In one preferred embodiment, some or all of these layers may be partially cured following application, so that the subsequent layer is applied to the underlying layer which has not been completely cured and therefore, optionally, is slightly tacky. This has the advantage of improving the adhesion between the individual layers.

Basecoat (B)

In the basecoat layer (B), as the coloring layer, there is at least one pigment and/or metallic flakes, responsible for the external appearance.

The coating material for the basecoat may, in one embodiment of the present invention, comprise a nonradiation-curable, solvent- or water-based, preferably water-based, one-component or two-component coating material, preferably a two-component coating material.

In another embodiment of the present invention it may be a water-based, radiation-curable coating material.

Preferably it is a water-based two-component coating material.

Relevant feature of the coating material is a solids content of between 20% and 80% by weight, preferably 25% to 60%, and more preferably 30% to 50%, by weight, based on the nonvolatile fractions of binder, pigment, and, optionally, additives.

In one preferred embodiment of the present invention, the coating material in question is substantially dried after application, with no absolute need for curing, particularly for complete curing, though this can be carried out.

Preferred water-based two-component polyurethane coating materials are those coating materials comprising at least one polyisocyanate, as is described in, for example, WO 2011/061314, page 5 line 29 to page 11 line 21, and at least one polyol component, as is described in, for example, WO 2011/061314, page 12 line 14 to page 17 line 31, each hereby incorporated by reference to become part of the present disclosure content. The water-emulsifiability of the polyisocyanate component can be achieved by addition of external emulsifiers, these being emulsifiers which substantially do not react with the polyisocyanate component, or using built-in emulsifiers, these being compounds which carry not only hydrophilic nonionic, anionic or cationic groups but also at least one isocyanate-reactive group.

Nonionic groups are frequently polyalkylene oxide ethers, preferably polyethylene oxide ethers; anionic groups may be, for example, carboxylate, sulfonate, phosphonate or phosphate groups; and cationic groups may be ammonium groups, for example.

Preferred one-component coating materials are cellulose acetobutyrates, examples being those having on average 0.5 to 2.1 acetyl groups and 2.3 to 0.6 butyryl groups per glucose unit, and also polyurethane dispersions.

Conceivable, though less preferred, are solvent-based two-component polyurethane coating materials as well, comprising at least one polyisocyanate, as described in, for example, WO 2011/061314, page 5 line 29 to page 11 line 21, and at least one polyol component, as described in, for example, WO 2011/061314, page 12 line 14 to page 17 line 31, each hereby incorporated by reference to become part of the present disclosure content.

Conceivably, albeit less preferably, the layer (B) may be composed of a water-based, radiation-curable coating material comprising (B1) at least one water-emulsifiable, radiation-curable binder, preferably selected from the group consisting of aliphatic urethane (meth)acrylates and polyester (meth)acrylates,
(B2) at least one reactive diluent,
(B3) at least one effect pigment and/or other pigment, and
(B4) water, the fraction of the compounds (B1) to (B3) as a proportion of the total amount of the compounds (B1) to (B3) being 20% to 80% by weight.

The water-emulsifiability of the binders can be achieved by addition of external emulsifiers, these being emulsifiers which are substantially not incorporated into the binder, or, preferably, using built-in emulsifiers, these being compounds which are built chemically into the binder and carry at least one hydrophilic nonionic, anionic or cationic group.

Nonionic groups are frequently polyalkylene oxide ethers, preferably polyethylene oxide ethers; anionic groups may be, for example, carboxylate, sulfonate, phosphonate or phosphate groups; and cationic groups may be ammonium groups, for example.

The coating materials described may be applied one or more times to the existing layer (A), and ought to be dried after each application, so that the solvent is substantially removed from the applied layer. Typical drying conditions are, for example, 5 to 60 minutes, preferably 5 to 45, more preferably 10 to 30, and more particularly 10 to 20 minutes, at a temperature of 40 to 120, preferably 50 to 100, and more preferably 60 to 80° C.

It is not absolutely necessary here to heat the entire rim to this temperature; it may also be sufficient to carry out drying in a stream of hot air or using IR or NIR sources, with NIR radiation here being electromagnetic radiation in the wavelength range from 760 nm to 2.5 μm, preferably from 900 to 1500 nm.

Also conceivable is low-temperature drying, having the potential advantage that solvent removed could be at least partly condensed, contributing to a reduction in the emissions of volatile organic compounds (VOC).

It is important that at least 75% by weight of the solvent contained in the coating material is removed by the drying operation, preferably at least 80%, more preferably at least 85%, very preferably at least 90%, and more particularly at least 95% by weight.

If drying is accompanied already by at least partial curing of the coating material, this is not a disadvantage, but instead is entirely desired. It is, however, not absolutely necessary to carry out full curing of the applied coating materials.

In one specific embodiment of the present invention, the coated rim can be mechanically aftertreated again after drying and curing of the coating material (B), but before application of the clearcoat layer (C), by eroding the coating on the outside (facing side) of the rims by means of turning, grinding and/or polishing, for example, and exposing the metal. This lustrous metal layer contrasts with the pigmented coating (B) and can then be coated in the next step directly with the clearcoat (C).

Clearcoat (C)

The clearcoat layer (C) is preferably applied only on the outside/facing side of the rims.

The function of the clearcoat is a combination of the properties of weathering resistance, chemical resistance, and scratch resistance.

In one preferred embodiment the coating material for this layer as well is entirely a radiation-curable coating material having free-radically polymerizable reactive groups. The coating material may optionally contain up to 10% by weight of at least one solvent if the latter is required as a flow control assistant or as a viscosity-lowering component.

The function of this clearcoat layer is to produce weathering and chemical resistance and also scratch resistance.

In one preferred embodiment of the present invention, the coating material for the layer (C) comprises (C1) at least one radiation-curable binder, preferably selected from the group consisting of aliphatic urethane (meth)acrylates and polyester (meth)acrylates,
(C2) at least one reactive diluent,
(C3) optionally one or more typical coatings additives selected from the group of antioxidants, activators (accelerators), extenders, pigments, dyes, antistats, —, light stabilizers, thickeners, thixotropic agents, surface-active agents, viscosity modifiers, plasticizers or chelating agents, preferably selected from the group consisting of light stabilizers, gloss assistants, and flow control assistants.

The coating materials for the layer (C) have a double bond density of free-radically polymerizable reactive groups per unit mass of coating material (based on the sum of components (C1) and (C2)) of at least 1 mol/kg, preferably at least 1.5, more preferably at least 2, very preferably at least 2.5, and more particularly at least 3 mol/kg. In general a double bond density of not more than 8 mol/kg, preferably not more than 7, and more preferably not more than 6 mol/kg is sufficient.

In one preferred embodiment, the coating material for the layer (C) has a viscosity at application temperature in accordance with DIN EN ISO 3219 (cone/plate system, shear rate 100 $s^{-1}$) of 60 to 1200 mPas, preferably of 100 to 300 mPas. Accordingly, the composition, comprising components (C1) and (C2) and also optionally solvents as flow control assistants (C3), of this coating material is selected such that this indicated viscosity is attained.

Binders

The radiation-curable binders in the coating materials may be selected for example from the group consisting of
  polyester (meth)acrylates
  polyether (meth)acrylates
  urethane (meth)acrylates
  epoxy (meth)acrylates
  (meth)acrylated polyacrylates
  melamine (meth)acrylates or
  carbonate (meth)acrylates.

Polyester (meth)acrylates are the corresponding esters of α,β-ethylenically unsaturated carboxylic acids, preferably of (meth)acrylic acid, more preferably of acrylic acid, with polyester polyols.

Polyester polyols are known for example from Ullmanns Encyklopädie der technischen Chemie, 4th edition, volume 19, pp. 62 to 65. It is preferred to use polyester polyols obtained by reacting dihydric alcohols with dibasic carboxylic acids. In place of the free polycarboxylic acids it is also possible to use the corresponding polycarboxylic anhydrides or corresponding polycarboxylic esters of lower alcohols, or mixtures thereof, for preparing the polyester polyols. The polycarboxylic acids may be aliphatic, cycloaliphatic, araliphatic, aromatic or heterocyclic and may optionally be substituted, by halogen atoms for example, and/or unsaturated. Examples thereof include the following:

Oxalic acid, maleic acid, fumaric acid, succinic acid, glutaric acid, adipic acid, sebacic acid, dodecanedioic acid, o-phthalic acid, isophthalic acid, terephthalic acid, trimellitic acid, azelaic acid, 1,4-cyclohexanedicarboxylic acid or tetrahydrophthalic acid, suberic acid, phthalic anhydride, tetrahydrophthalic anhydride, hexahydrophthalic anhydride, tetrachlorophthalic anhydride, endomethylenetetrahydrophthalic anhydride, glutaric anhydride, maleic anhydride, dimeric fatty acids, isomers thereof and hydrogenation products thereof, and also esterifiable derivatives, such as anhydrides or dialkyl esters, examples being $C_1$-$C_4$ alkyl esters, preferably methyl, ethyl or n-butyl esters, of the acids stated are used. Preference is given to dicarboxylic acids of the general formula HOOC—$(CH_2)_y$—COOH, where y is a number from 1 to 20, preferably an even number from 2 to 20, more preferably succinic acid, adipic acid, sebacic acid, and dodecanedicarboxylic acid.

Polyhydric alcohols contemplated for preparing the polyesterols include 1,2-propanediol, ethylene glycol, 2,2-dimethyl-1,2-ethanediol, 1,3-propanediol, 1,2-butanediol, 1,3-butanediol, 1,4-butanediol, 3-methylpentane-1,5-diol, 2-ethylhexane-1,3-diol, 2,4-diethyloctane-1,3-diol, 1,6-hexanediol, poly THF having a molar mass between 162 and 2000, poly-1,3-propanediol having a molar mass between 134 and 1178, poly-1,2-propanediol having a molar mass between 134 and 898, polyethylene glycol having a molar mass between 106 and 458, neopentylglycol, neopentylglycol hydroxypivalate, 2-ethyl-1,3-propanediol, 2-methyl-1,3-propanediol, 2,2-bis(4-hydroxycyclohexyl)propane, 1,1-, 1,2-, 1,3-, and 1,4-cyclohexanedimethanol, 1,2-, 1,3- or 1,4-cyclohexanediol, trimethylolbutane, trimethylolpropane, trimethylolethane, neopentylglycol, pentaerythritol, glycerol, ditrimethylolpropane, dipentaerythritol, sorbitol, mannitol, diglycerol, threitol, erythritol, adonitol (ribitol), arabitol (lyxitol), xylitol, dulcitol (galactitol), maltitol or isomalt, which optionally may be alkoxylated as described above.

Preferred alcohols are those of the general formula HO—$(CH_2)_x$—OH, where x is a number from 1 to 20, preferably an even number from 2 to 20. Preferred are ethylene glycol, butane-1,4-diol, hexane-1,6-diol, octane-1,8-diol, and dodecane-1,12-diol. Further preferred is neopentylglycol.

Also contemplated, furthermore, are polycarbonate diols, of the kind obtainable, for example, by reacting phosgene with an excess of the low molecular mass alcohols specified as synthesis components for the polyester polyols.

Also suitable are lactone-based polyester diols, which are homopolymers or copolymers of lactones, preferably hydroxyl-terminal adducts of lactones with suitable difunctional starter molecules. Lactones contemplated are preferably those deriving from compounds of the general formula HO—$(CH_2)_z$—COOH, where z is a number from 1 to 20 and where one H atom in a methylene unit may also be substituted by a $C_1$ to $C_4$ alkyl radical. Examples are ε-caprolactone, β-propiolactone, gamma-butyrolactone and/or methyl-ε-caprolactone, 4-hydroxybenzoic acid, 6-hydroxy-2-naphthoic acid or pivalolactone, and mixtures thereof. Suitable starter components are, for example, the low molecular mass dihydric alcohols specified above as a synthesis component for the polyester polyols. The corresponding polymers of ε-caprolactone are particularly preferred. Lower polyester diols or polyether diols as well may be used as starters for preparing the lactone polymers. In place of the polymers of lactones it is also possible to use the corresponding, chemically equivalent polycondensates of the hydroxycarboxylic acids corresponding to the lactones.

Polyether (meth)acrylates are the corresponding esters of α,β-ethylenically unsaturated carboxylic acids, preferably of (meth)acrylic acid, more preferably of acrylic acid, with polyetherols.

Preferred in the case of the polyetherols are polyethylene glycol having a molar mass between 106 and 2000, preferably 106 to 1500, more preferably 106 to 1000, poly-1,2-propanediol having a molar mass between 134 and 1178, poly-1,3-propanediol having a molar mass between 134 and 1178, and polytetrahydrofurandiol having a number-average molecular weight $M_n$ in the range of about 500 to 4000, preferably 600 to 3000, more particularly 750 to 2000.

Urethane (meth)acrylates are obtainable, for example, by reacting polyisocyanates with hydroxyalkyl (meth)acrylates or hydroxyalkyl vinyl ethers and, optionally, chain extenders such as diols, polyols, diamines, polyamines or dithiols or polythiols.

Exemplary urethane (meth)acrylates comprise as synthesis components substantially:

(a) at least one organic aliphatic, aromatic or cycloaliphatic di- or polyisocyanate,
(b) at least one compound having at least one isocyanate-reactive group and at least one free-radically polymerizable unsaturated group,
(c) optionally, at least one compound having at least two isocyanate-reactive groups.

For example, aliphatic, aromatic and cycloaliphatic di- and polyisocyanates having an NCO functionality of at least 1.8, preferably 1.8 to 5 and more preferably 2 to 4, and the isocyanurates, biurets, allophanates and uretdiones thereof, are suitable as component (a).

The diisocyanates are preferably isocyanates having 4 to 20 C atoms. Examples of conventional diisocyanates are aliphatic diisocyanates, such as tetramethylene diisocyanate, hexamethylene diisocyanate (1,6-diisocyanatohexane), octamethylene diisocyanate, decamethylene diisocyanate, dodecamethylene diisocyanate, tetradecamethylene diisocyanate, derivatives of lysine diisocyanate, tetramethylxylylene diisocyanate, trimethylhexane diisocyanate or tetramethylhexane diisocyanate, cycloaliphatic diisocyanates, such as 1,4-, 1,3- or 1,2-diisocyanatocyclohexane, 4,4'- or 2,4'-di(isocyanatocyclohexyl)methane, 1-isocyanato-3,3,5-trimethyl-5-(isocyanatomethyl)cyclohexane (isophorone diisocyanate), 1,3- or 1,4-bis(isocyanatomethyl)cyclohexane or 2,4- or 2,6-diisocyanato-1-methylcyclohexane, and also 3 (or 4), 8 (or 9)-bis(isocyanatomethyl)tricyclo[$5.2.1.0^{2,6}$]decane isomer mixtures, and aromatic diisocyanates, such as toluene 2,4- or 2,6-diisocyanate and the isomer mixtures thereof, m- or p-xylylene diisocyanate, 2,4'- or 4,4'-diisocyanatodiphenylmethane and the isomer mixtures thereof, phenylene 1,3- or 1,4-diisocyanate, 1-chlorophenylene 2,4-diisocyanate, naphthylene 1,5-diisocyanate, biphenylene 4,4'-diisocyanate, 4,4'-diisocyanato-3,3'-dimethylbiphenyl, 3-methyldiphenylmethane 4,4'-diisocyanate, tetramethylxylylene diisocyanate, 1,4-diisocyanatobenzene or 4,4'-diisocyanatodiphenyl ether.

Mixtures of said diisocyanates may also be present.

Hexamethylene diisocyanate, 1,3-bis(isocyanatomethyl)cyclohexane, isophorone diisocyanate and di(isocyanatocyclohexyl)methane are preferred.

Depending on whether the diisocyanate on which the polyisocyanate is based is aromatic or nonaromatic, the resultant urethane (meth)acrylate is referred to as an aromatic urethane (meth)acrylate or as an aliphatic urethane (meth)acrylate.

Suitable polyisocyanates are polyisocyanates having isocyanurate groups, uretdione diisocyanates and polyisocyanates having biuret groups, polyisocyanates having urethane or allophanate groups, polyisocyanates comprising oxadiazinetrione groups, uretonimine-modified polyisocyanates of linear or branched $C_4$-$C_{20}$ alkylene diisocyanates, cycloaliphatic diisocyanates having in total 6 to 20 C atoms or aromatic diisocyanates having in total 8 to 20 C atoms or mixtures thereof.

The di- and polyisocyanates which can be used preferably contain from 10% to 60% by weight, based on the di- and polyisocyanate (mixture), preferably from 15% to 60% by weight and particularly preferably from 20% to 55% by weight, of isocyanate groups (calculated as NCO, molecular weight=42).

Aliphatic or cycloaliphatic di- and polyisocyanates, for example the abovementioned aliphatic or cycloaliphatic diisocyanates, or mixtures thereof, are preferred.

The following are furthermore preferred:
1) Polyisocyanates having isocyanurate groups and obtained from aromatic, aliphatic and/or cycloaliphatic diisocyanates. Particularly preferred here are the corresponding aliphatic and/or cycloaliphatic isocyanatoisocyanurates and in particular those based on hexamethylene diisocyanate and isophorone diisocyanate. The isocyanurates present are in particular trisisocyanatoalkyl or trisisocyanatocycloalkyl isocyanurates, which are cyclic trimers of the diisocyanates, or are mixtures with their higher homologs having more than one isocyanurate ring. The isocyanatoisocyanurates generally have an NCO content of from 10% to 30% by weight, in particular from 15% to 25% by weight, and an average NCO functionality of from 3 to 4.5.
2) Uretdione diisocyanates having aromatically, aliphatically and/or cycloaliphatically bonded isocyanate groups, preferably having aliphatically and/or cycloaliphatically bonded groups and in particular those derived from hexamethylene diisocyanate or isophorone diisocyanate. Uretdione diisocyanates are cyclic dimerization products of diisocyanates.
The uretdione diisocyanates can be used in the formulations as a sole component or as a mixture with other polyisocyanates, in particular those mentioned under 1).
3) Polyisocyanates having biuret groups and having aromatically, cycloaliphatically or aliphatically bonded, preferably cycloaliphatically or aliphatically bonded, isocyanate groups, in particular tris(6-isocyanatohexyl)biuret or mixtures thereof with its higher homologs. These polyisocyanates having biuret groups generally have an NCO content of from 18% to 22% by weight and an average NCO functionality of from 3 to 4.5.
4) Polyisocyanates having urethane and/or allophanate groups and having aromatically, aliphatically or cycloaliphatically bonded, preferably aliphatically or cycloaliphatically bonded, isocyanate groups, as can be obtained, for example, by reaction of excess amounts of hexamethylene diisocyanate or of isophorone diisocyanate with polyhydric alcohols, such as, for example, trimethylolpropane, neopentyl glycol, pentaerythritol, 1,4-butanediol, 1,6-hexanediol, 1,3-propanediol, ethylene glycol, diethylene glycol, glycerol, 1,2-dihydroxypropane or mixtures thereof. These polyisocyanates having urethane and/or allophanate groups generally have an NCO content of from 12% to 20% by weight and an average NCO functionality of from 1.8 to 3.
5) Polyisocyanates comprising oxadiazinetrione groups, preferably derived from hexamethylene diisocyanate or isophorone diisocyanate. Such polyisocyanates comprising oxadiazinetrione groups can be prepared from diisocyanate and carbon dioxide.
6) Uretonimine-modified polyisocyanates.

The polyisocyanates 1) to 6) can be used as a mixture, optionally also as a mixture with diisocyanates.

Compounds suitable as component (b) are those which carry at least one isocyanate-reactive group and at least one free-radically polymerizable group.

Groups reactive toward isocyanate may be, for example, —OH, —SH, —NH$_2$ and —NHR', where R' is hydrogen or an alkyl group comprising 1 to 4 carbon atoms, such as, for example, methyl, ethyl, n-propyl, isopropyl, n-butyl, isobutyl, sec-butyl or tert-butyl.

Components (b) may be, for example, monoesters of α,β-unsaturated carboxylic acids, such as acrylic acid, methacrylic acid, crotonic acid, itaconic acid, fumaric acid, maleic acid, acrylamidoglycolic acid or methacrylamidoglycolic acid, or vinyl ethers with di- or polyols, which preferably have 2 to 20 carbon atoms and at least two hydroxyl groups, such as ethylene glycol, diethylene glycol, triethylene glycol, 1,2-propylene glycol, 1,3-propylene glycol, 1,1-dimethyl-1,2-ethanediol, dipropylene glycol, triethylene glycol, tetraethylene glycol, pentaethylene glycol, tripropylene glycol, 1,4-butanediol, 1,5-pentanediol, neopentylglycol, 1,6-hexanediol, 2-methyl-1,5-pentanediol, 2-ethyl-1,4-butanediol, 1,4-dimethylolcyclohexane, 2,2-bis(4-hydroxycyclohexyl)propane, glycerol, trimethylolethane, trimethylolpropane, trimethylolbutane, pentaerythritol, ditrimethylolpropane, erythritol, sorbitol, poly THF having a molar weight of between 162 and 2000, poly-1,3-propanediol having a molar weight of between 134 and 400 or polyethylene glycol having a molar weight of between 238 and 458. It is furthermore possible to use esters or amides of (meth)acrylic acid with amino alcohols, e.g. 2-aminoethanol, 2-(methylamino)ethanol, 3-amino-1-propanol, 1-amino-2-propanol or 2-(2-aminoethoxy)ethanol, 2-mercaptoethanol or polyaminoalkanes, such as ethylenediamine or diethylenetriamine, or vinylacetic acid.

Unsaturated polyetherols or polyesterols or polyacrylate polyols having an average OH functionality of 2 to 10 are furthermore suitable.

Examples of amides of ethylenically unsaturated carboxylic acids with amino alcohols are hydroxyalkyl(meth)acrylamides, such as N-hydroxymethylacrylamide, N-hydroxymethylmethacrylamide, N-hydroxyethylacrylamide, N-hydroxyethylmethacrylamide, 5-hydroxy-3-oxapentyl (meth)acrylamide, N-hydroxyalkylcrotonamides, such as N-hydroxymethylcrotonamide or N-hydroxyalkylmaleimides, such as N-hydroxyethylmaleimide.

2-Hydroxyethyl (meth)acrylate, 2- or 3-hydroxypropyl (meth)acrylate, 1,4-butanediol mono(meth)acrylate, neopentylglycol mono(meth)acrylate, 1,5-pentanediol mono(meth)acrylate, 1,6-hexanediol mono(meth)acrylate, glyceryl mono- and di(meth)acrylate, trimethylolpropane mono- and di(meth)acrylate, pentaerythrityl mono-, di- and tri(meth)acrylate, and 4-hydroxybutyl vinyl ether, 2-aminoethyl (meth)acrylate, 2-aminopropyl (meth)acrylate, 3-aminopropyl (meth)acrylate, 4-aminobutyl (meth)acrylate, 6-aminohexyl (meth)acrylate, 2-thioethyl (meth)acrylate, 2-aminoethyl(meth)acrylamide, 2-aminopropyl(meth)acrylamide, 3-aminopropyl-(meth)acrylamide, 2-hydroxyethyl(meth) acrylamide, 2-hydroxypropyl(meth)acrylamide or 3-hydroxypropyl(meth)acrylamide are preferably used. 2-Hydroxyethyl acrylate, 2-hydroxyethyl methacrylate, 2- or 3-hydroxypropyl acrylate, 1,4-butanediol monoacrylate and 3-(acryloyloxy)-2-hydroxypropyl methacrylate are particularly preferred.

Compounds which are suitable as component (c) are those which have at least two groups reactive toward isocyanate, for example —OH, —SH, —NH$_2$ or —NHR$^2$, where R$^2$ therein, independently of one another, may be hydrogen, methyl, ethyl, isopropyl, n-propyl, n-butyl, isobutyl, sec-butyl or tert-butyl.

These are preferably diols or polyols, such as hydrocarbondiols having 2 to 20 carbon atoms, e.g. ethylene glycol, 1,2-propanediol, 1,3-propanediol, 1,1-dimethylethane-1,2-diol, 1,6-hexanediol, 1,10-decanediol, bis(4-hydroxycyclohexane)isopropylidene, tetramethylcyclobutanediol, 1,2-, 1,3- or 1,4-cyclohexanediol, cyclooctanediol, norbornanediol, pinanediol, decalindiol, etc., esters thereof with short-chain dicarboxylic acids, such as adipic acid or cyclohexanedicarboxylic acid, carbonates thereof, prepared by reaction of the diols with phosgene or by transesterification with dialkyl or diaryl carbonates, or aliphatic diamines, such as methylene- and isopropylidenebis(cyclohexylamine), piperazine, 1,2-, 1,3- or 1,4-diaminocyclohexane, 1,2-, 1,3- or 1,4-cyclohexanebis(methylamine), etc., dithiols or polyfunctional alcohols, secondary or primary amino alcohols, such as ethanolamine, diethanolamine, monopropanolamine, dipropanolamine, etc., or thioalcohols, such as thioethylene glycol.

Diethylene glycol, triethylene glycol, dipropylene glycol, tripropylene glycol, neopentyl glycol, pentaerythritol, 1,2- and 1,4-butanediol, 1,5-pentanediol, 2-methyl-1,5-pentanediol, 2-ethyl-1,4-butanediol, 1,2-, 1,3- and 1,4-dimethylolcyclohexane, 2,2-bis(4-hydroxycyclohexyl)propane, glycerol, trimethylolethane, trimethylolpropane, trimethylolbutane, dipentaerythritol, ditrimethylolpropane, erythritol and sorbitol, 2-aminoethanol, 3-amino-1-propanol, 1-amino-2-propanol or 2-(2-aminoethoxy)ethanol, bisphenol A or butanetriol are furthermore conceivable.

Unsaturated polyetherols or polyesterols or polyacrylate polyols having an average OH functionality of 2 to 10, and polyamines, such as, for example, polyethylenimine, or polymers of, for example, poly-N-vinylformamide which comprise free amine groups, are furthermore suitable.

The cycloaliphatic diols, such as, for example, bis(4-hydroxycyclohexane)isopropylidene, tetramethylcyclobutanediol, 1,2-, 1,3- or 1,4-cyclohexanediol, cyclooctanediol or norbornanediol, are particularly suitable here.

The urethane (meth)acrylates which can be used by way of example are obtained by reacting the components (a), (b) and (c) with one another.

The molar composition (a):(b):(c) per 3 mol of reactive isocyanate groups in (a) here is generally as follows:
(b) 0.5-3.0, preferably 0.8-2.5, particularly preferably 1.0-2.2 and in particular 1.4-1.8 mol of groups reactive toward isocyanate and
(c) 0-2.0, preferably 0.1-1.8, particularly preferably 0.5-1.5 and in particular 0.8-1.3 mol of groups reactive toward isocyanate.

The formation of the adduct from the compound containing isocyanate groups and the compound which comprises groups reactive toward isocyanate groups is effected, as a rule, by mixing the components in any desired sequence, optionally at elevated temperature.

Preferably, the compound which comprises groups reactive toward isocyanate groups is added to the compound containing isocyanate groups, preferably in a plurality of steps.

Particularly preferably, the compound containing isocyanate groups is initially taken and the compounds which comprise groups reactive toward isocyanate are added. In particular, the compound (a) containing isocyanate groups is initially taken and then (b) is added. Optionally, desired further components can subsequently be added.

As a rule, the reaction is carried out at temperatures between 5 and 100° C., preferably between 20 to 90° C. and particularly preferably between 40 and 80° C. and in particular between 60 and 80° C.

The procedure is preferably carried out under anhydrous conditions.

Here, anhydrous means that the water content in the reaction system is not more than 5% by weight, preferably not more than 3% by weight and particularly preferably not more than 1% by weight.

In order to suppress polymerization of the polymerizable double bonds, the procedure is preferably carried out under an oxygen-containing gas, particularly preferably air or air-nitrogen mixtures.

Air or a mixture of oxygen or air and a gas which is inert under the conditions of use can preferably be used as the oxygen-containing gas. Nitrogen, helium, argon, carbon monoxide, carbon dioxide, steam, lower hydrocarbons or mixtures thereof can be used as the inert gas.

The oxygen content of the oxygen-containing gas may be, for example, between 0.1% and 22% by volume, preferably from 0.5 to 20, particularly preferably from 1 to 15, very particularly preferably from 2 to 10 and in particular from 4 to 10% by volume. If desired, higher oxygen contents can of course also be used.

The reaction can also be carried out in the presence of an inert solvent, e.g. acetone, isobutyl methyl ketone, toluene, xylene, butyl acetate or ethoxyethyl acetate. However, the reaction is preferably carried out in the absence of a solvent.

The urethane (meth)acrylates preferably have a number average molar weight $M_n$ of at least 500 and preferably at least 1000 g/mol. They preferably have a number average molar weight $M_n$ of up to 20 000, particularly preferably up to 10 000 and very particularly preferably up to 4000, g/mol (determined by gel permeation chromatography using tetrahydrofuran and polystyrene as standard).

The urethane (meth)acrylates preferably contain from 1 to 5, particularly preferably from 2 to 4, mol of (meth)acrylic groups per 1000 g of urethane (meth)acrylate.

The urethane vinyl ethers preferably contain from 1 to 5, particularly preferably from 2 to 4, mol of vinyl ether groups per 1000 g of urethane vinyl ether.

Epoxide (meth)acrylates are obtainable by reacting epoxides with (meth)acrylic acid. Suitable epoxides are, for example, epoxidized olefins, aromatic glycidyl ethers or aliphatic glycidyl ethers, preferably those of aromatic or aliphatic glycidyl ethers.

Epoxidized olefins may be, for example, ethylene oxide, propylene oxide, isobutylene oxide, 1-butene oxide, 2-butene oxide, vinyloxirane, styrene oxide or epichlorohydrin, preferably ethylene oxide, propylene oxide, isobutylene oxide, vinyloxirane, styrene oxide or epichlorohydrin, particularly preferably ethylene oxide, propylene oxide or epichlorohydrin and very particularly preferably ethylene oxide and epichlorohydrin.

Aromatic glycidyl ethers are, for example, bisphenol A diglycidyl ether, bisphenol F diglycidyl ether, bisphenol B diglycidyl ether, bisphenol S diglycidyl ether, hydroquinone diglycidyl ether, alkylation products of phenol/dicyclopentadiene, e.g. 2,5-bis[(2,3-epoxypropoxy)phenyl]octahydro-4, 7-methano-5H-indene (CAS No. [13446-85-0]), tris[4-(2,3- epoxypropoxy)phenyl]methane isomers (CAS No. [66072-39-7]), phenol-based epoxy novolaks (CAS No. [9003-35-4]) and cresol-based epoxy novolaks (CAS No. [37382-79-9]).

Aliphatic glycidyl ethers are, for example, 1,4-butanediol diglycidyl ether, 1,6-hexanediol diglycidyl ether, trimethylolpropane triglycidyl ether, pentaerythrityl tetraglycidyl ether, 1,1,2,2-tetrakis[4-(2,3-epoxypropoxy)phenyl]ethane (CAS No. [27043-37-4]), diglycidyl ethers of polypropylene glycol (α,ω-bis(2,3-epoxypropoxy)poly(oxypropylene)) (CAS No. [16096-30-3]) and of hydrogenated bisphenol A (2,2-bis[4-(2,3-epoxypropoxy)cyclohexyl]propane) (CAS No. [13410-58-7]).

The epoxide (meth)acrylates and epoxide vinyl ethers preferably have a number average molar weight $M_n$ of from 200 to 20 000, particularly preferably from 200 to 10 000, g/mol and very particularly preferably from 250 to 3000 g/mol; the content of (meth)acrylic and vinyl ether groups is preferably from 1 to 5, particularly preferably from 2 to 4, per 1000 g of epoxide (meth)acrylate or vinyl ether epoxide (determined by gel permeation chromatography using polystyrene as a standard and tetrahydrofuran as an eluent).

(Meth)acrylated polyacrylates are the corresponding esters of α,β-ethylenically unsaturated carboxylic acids, preferably of (meth)acrylic acid, more preferably of acrylic acid, with polyacrylate polyols.

Such polyacrylate polyols preferably have a molecular weight $M_n$ of at least 1000, more preferably at least 2000, and very preferably at least 5000 g/mol. The molecular weight $M_n$ may be for example up to 200 000, preferably up to 100 000, more preferably up to 80 000, and very preferably up to 50 000 g/mol.

Preferred OH numbers for the polyacrylate polyols, measured in accordance with DIN 53240-2, are 15-250 mg KOH/g, preferably 80-160 mg KOH/g.

Additionally the polyacrylate polyols may have an acid number to DIN EN ISO 3682 of up to 200 mg KOH/g, preferably up to 150 and more preferably up to 100 mg KOH/g.

The polyacrylate polyols are copolymers of at least one (meth)acrylic ester having at least one compound having at least one, preferably exactly one, hydroxyl group and at least one, preferably exactly one, (meth)acrylate group.

The latter may be, for example, monoesters of α,β-unsaturated carboxylic acids, such as acrylic acid, methacrylic acid (referred to for short in this specification as "(meth)acrylic acid"), with diols or polyols, which preferably have 2 to 20 C atoms and have at least two hydroxyl groups, such as ethylene glycol, diethylene glycol, triethylene glycol, 1,2-propylene glycol, 1,3-propylene glycol, 1,1-dimethyl-1,2-ethanediol, dipropylene glycol, triethylene glycol, tetraethylene glycol, pentaethylene glycol, tripropylene glycol, 1,4-butanediol, 1,5-pentanediol, neopentylglycol, neopentylglycol hydroxypivalate, 2-ethyl-1,3-propanediol, 2-methyl-1,3-propanediol, 2-butyl-2-ethyl-1,3-propanediol, 1,6-hexanediol, 2-methyl-1,5-pentanediol, 2-ethyl-1,4-butanediol, 2-ethyl-1,3-hexanediol, 2,4-diethyloctane-1,3-diol, 2,2-bis(4-hydroxycyclohexyl)propane, 1,1-, 1,2-, 1,3-, and 1,4-bis(hydroxymethyl)cyclohexane, 1,2-, 1,3- or 1,4-cyclohexanediol, glycerol, trimethylolethane, trimethylolpropane, trimethylolbutane, pentaerythritol, ditrimethylolpropane, dipentarythritol, sorbitol, mannitol, diglycerol, threitol, erythritol, adonitol (ribitol), arabitol (lyxitol), xylitol, dulcitol (galactitol), maltitol, isomalt, polyTHF having a molar weight between 162 and 4500, preferably 250 to 2000, poly-1,3-propanediol or polypropylene glycol having a molar weight between 134 and 2000, or polyethylene glycol having a molar weight between 238 and 2000.

Preference is given to 2-hydroxyethyl acrylate, 2-hydroxyethyl methacrylate, 2- or 3-hydroxypropyl acrylate, 1,4-butanediol monoacrylate or 3-(acryloyloxy)-2-hydroxypropyl acrylate, and more preferably 2-hydroxyethyl acrylate and/or 2-hydroxyethyl methacrylate.

The hydroxyl-bearing monomers are used in the copolymerization in a mixture with other polymerizable monomers, preferably free-radically polymerizable monomers, preferably those consisting to an extent of more than 50% by weight of $C_1$-$C_{20}$, preferably C1 to C4 alkyl (meth)acrylate, (meth)acrylic acid, vinylaromatics having up to 20 C atoms, vinyl esters of carboxylic acids comprising up to 20 C atoms, vinyl halides, nonaromatic hydrocarbons having 4 to 8 C atoms and 1 or 2 double bonds, unsaturated nitriles, and mixtures thereof. Particularly preferred are the polymers which consist to an extent of more than 60% by weight of $C_1$-$C_{10}$ alkyl (meth)acrylates, styrene, vinylimidazole or mixtures thereof.

The polymers may further comprise hydroxy-functional monomers in line with the above hydroxyl group content, and optionally further monomers, examples being (meth)acrylic acid glycidyl epoxy esters, ethylenically unsaturated acids, more particularly carboxylic acids, acid anhydrides or acid amides.

Examples of suitable ethylenically unsaturated melamine resins are the reaction products of melamine/formaldehyde condensates with OH-containing, ethylenically unsaturated compounds, ethylenically unsaturated dicarboxylic anhydrides, or with the amides of ethylenically unsaturated monocarboxylic acids. Suitable melamine/formaldehyde condensates are more particularly hexamethylolmelamine (HMM) and hexamethoxymethylolmelamine (HMMM). Examples of suitable OH-containing compounds include the hydroxyalkyl esters of ethylenically unsaturated carboxylic acids, particularly of acrylic acid and of methacrylic acid. Additionally suitable for the reaction with HMM are ethylenically unsaturated alcohols, such as allyl alcohol or crotyl alcohol, or ethylenically unsaturated dicarboxylic anhydrides, such as maleic anhydride. Furthermore, it is possible to modify not only HMM but also HMMM with the amides of ethylenically unsaturated carboxylic acids, examples being acrylamide or methacrylamide, to give ethylenically unsaturated melamine resins. Melamine resins of these kinds are known to the skilled person and described in, for example, P.K.T. Oldring, p. 208 to p. 214, and also in EP-A 464 466 and DE-A 25 50 740, hereby incorporated by reference for further details.

Carbonate (meth)acrylates are likewise obtainable with various functionalities.

The number-average molecular weight $M_n$ of the carbonate (meth)acrylates is preferably less than 3000 g/mol, more preferably less than 1500 g/mol, more preferably less than 800 g/mol (determined by gel permeation chromatography using polystyrene as a standard and tetrahydrofuran as a solvent).

The carbonate (meth)acrylates are obtainable in a simple manner by transesterification of carbonic esters with polyhydric, preferably dihydric, alcohols (diols, e.g. hexanediol) and subsequent esterification of the free OH groups with (meth)acrylic acid, or transesterification with (meth)acrylic esters, as described, for example, in EP-A 92 269. They are also obtainable by reacting phosgene, urea derivatives with polyhydric, e.g. dihydric, alcohols.

In an analogous manner, vinyl ether carbonates are also obtainable by reacting a hydroxyalkyl vinyl ether with carbonic esters and, optionally, dihydric alcohols.

(Meth)acrylates or vinyl ethers of polycarbonatepolyols, such as the reaction product of one of said di- or polyols and a carbonic ester and of a hydroxyl-containing (meth)acrylate or vinyl ether, are also conceivable.

Suitable carbonic esters are, for example, ethylene or 1,2- or 1,3-propylene carbonate or dimethyl, diethyl or dibutyl carbonate.

Suitable hydroxyl-containing (meth)acrylates are, for example, 2-hydroxyethyl (meth)acrylate, 2- or 3-hydroxypropyl (meth)acrylate, 1,4-butanediol mono(meth)acrylate, neopentylglycol mono(meth)acrylate, glyceryl mono- and di(meth)acrylate, trimethylolpropane mono- and di(meth)acrylate and pentaerythrityl mono-, di- and tri(meth)acrylate.

Suitable hydroxyl-containing vinyl ethers are, for example, 2-hydroxyethyl vinyl ether and 4-hydroxybutyl vinyl ether.

Particularly preferred carbonate (meth)acrylates are those of the formula:

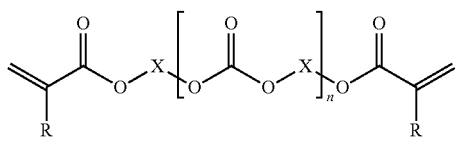

where R is H or $CH_3$, X is a $C_2$-$C_{18}$ alkylene group and n is an integer from 1 to 5, preferably from 1 to 3.

R is preferably H and X is preferably $C_2$ to $C_{10}$ alkylene, for example 1,2-ethylene, 1,2-propylene, 1,3-propylene, 1,4-butylene or 1,6-hexylene, particularly preferably C4 to 08 alkylene. Very particularly preferably, X is $C_6$ alkylene.

The carbonate (meth)acrylates are preferably aliphatic carbonate (meth)acrylates.

Reactive Diluents

Reactive diluents in the context of the present specification are those compounds having in general one to four free-radically polymerizable reactive groups which at 23° C. have a viscosity in accordance with DIN EN ISO 3219 (cone/plate system, shear rate 100 s$^{-1}$) below 150 mPas.

In accordance with the present specification, the reactive diluents preferably are selected from the group consisting of polyfunctional (meth)acrylic esters and monofunctional (meth)acrylic esters, more preferably from such (meth)acrylic esters having a molar weight of up to 350 g/mol.

Polyfunctional (meth)acrylic esters may be, for example, esters of α,β-ethylenically unsaturated carboxylic esters, preferably of (meth)acrylic acid, more preferably of acrylic acid, with correspondingly at least difunctional polyalcohols.

Polyalcohols of this kind are, for example, at least dihydric polyols, polyetherols or polyesterols, or polyacrylate polyols, having an average OH functionality of at least 2, preferably 3 to 10, suitably.

Examples of polyfunctional, polymerizable compounds are ethylene glycol diacrylate, 1,2-propanediol diacrylate, 1,3-propanediol diacrylate, 1,4-butanediol diacrylate, 1,3-butanediol diacrylate, 1,5-pentanediol diacrylate, 1,6-hexanediol diacrylate, 1,8-octanediol diacrylate, neopentylglycol diacrylate, 1,1-, 1,2-, 1,3-, and 1,4-cyclohexanedimethanol diacrylate, and 1,2-, 1,3- or 1,4-cyclohexanediol diacrylate.

Other examples of polyfunctional polymerizable compounds are trimethylolpropane triacrylate, ditrimethylolpropane pentaacrylate or hexaacrylate, pentaerythritol triacrylate or tetraacrylate, glycerol diacrylate or triacrylate, and also diacrylates and polyacrylates of sugar alcohols, such as, for example, sorbitol, mannitol, diglycerol, threitol, erythritol, adonitol (ribitol), arabitol (lyxitol), xylitol, dulcitol (galactitol), maltitol or isomalt.

Further examples thereof are (meth)acrylates of compounds of the formula (IIa) to (IId),

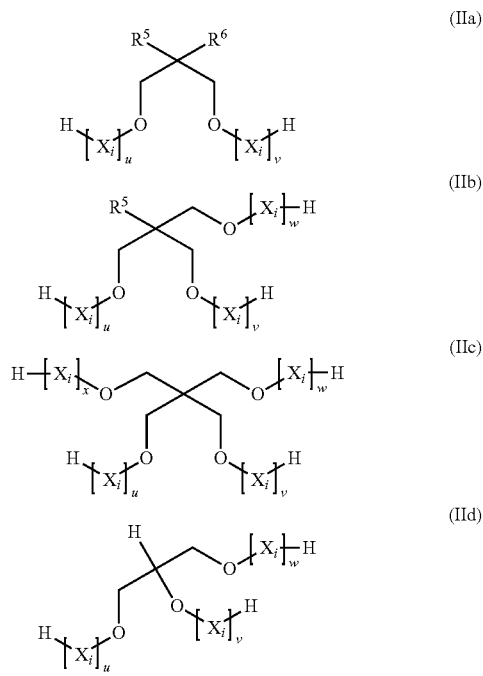

in which
$R^5$ and $R^6$ independently of one another are hydrogen or are $C_1$-$C_{18}$ alkyl optionally substituted by aryl, alkyl, aryloxy, alkyloxy, heteroatoms and/or heterocycles, u, v, w, and x independently of one another are each an integer from 1 to 10, preferably 1 to 5, and more preferably 1 to 3, and each $X_i$ for i=1 to u, 1 to v, 1 to w, and 1 to x, independently of one another, may be selected from the group —$CH_2$—$CH_2$—O—, —$CH_2$—$CH(CH_3)$—O—, —$CH(CH_3)$—$CH_2$—O—, —$CH_2$—$C(CH_3)_2$—O—, —$C(CH_3)_2$—$CH_2$—O—, —$CH_2$—CHVin-O—, —CHVin-$CH_2$—O—, —$CH_2$—CHPh-O— and —CHPh-$CH_2$—O—, preferably from the group —$CH_2$—$CH_2$—O—, —$CH_2$—CH($CH_3$)—O—, and —CH($CH_3$)—$CH_2$—O—, and more preferably —$CH_2$—$CH_2$—O—, in which Ph stands for phenyl and Vin stands for vinyl.

Herein, $C_1$-$C_{18}$ alkyl optionally substituted by aryl, alkyl, aryloxy, alkyloxy, heteroatoms and/or heterocycles means, for example, methyl, ethyl, propyl, isopropyl, n-butyl, sec-butyl, tert-butyl, pentyl, hexyl, heptyl, octyl, 2-ethylhexyl, 2,4,4-trimethylpentyl, decyl, dodecyl, tetradecyl, hexadecyl, octadecyl, 1,1-dimethylpropyl, 1,1-dimethylbutyl, 1,1,3,3-tetramethylbutyl, preferably methyl, ethyl or n-propyl, very preferably methyl or ethyl.

Preferably these are (meth)acrylates of singly to vigintuply and more preferably triply to decuply ethoxylated, propoxylated or mixedly ethoxylated and propoxylated, and more particularly exclusively ethoxylated, neopentylglycol, trimethylolpropane, trimethylolethane or pentaerythritol.

Preferred polyfunctional polymerizable compounds are ethylene glycol diacrylate, 1,2-propane-diol diacrylate, 1,3-propanediol diacrylate, 1,4-butanediol diacrylate, 1,6-hexanediol diacrylate, trimethylolpropane triacrylate, pentaerythritol tetraacrylate, and tricrylate of singly to vigintuply alkoxylated, more preferably ethoxylated, trimethylolpropane.

Especially preferred polyfunctional polymerizable compounds are 1,4-butanediol diacrylate, 1,6-hexanediol diacrylate, trimethylolpropane triacrylate, pentaerythritol tetraacrylate, and triacrylate of singly to vigintuply ethoxylated trimethylolpropane.

Monofunctional (meth)acrylic esters are those having exactly one (meth)acrylic acid group. Examples thereof are alkyl (meth)acrylates, cycloalkyl (meth)acrylates, and (meth)acrylates of heterocyclic compounds.

Examples of alkyl (meth)acrylates are esters of (meth)acrylic acid with alcohols having 1 to 20 C atoms, preferably $C_1$-$C_{20}$ alkyl (meth)acrylates, more preferably selected from the group consisting of methyl (meth)acrylate, ethyl (meth)acrylate, n-butyl (meth)acrylate, and 2-ethyl-hexyl (meth)acrylate.

The alcohols may also be substituted, as is the case, for example, with 2-phenoxyethyl acrylate or 2-((2'-ethoxy)ethoxy)ethyl acrylate.

Examples of cycloalkyl (meth)acrylates are esters of (meth)acrylic acid with cycloalkanols or bicycloalkanols, the cycloalkanol or bicycloalkanol having from 3 to 20 carbon atoms, preferably 5 to 10 carbon atoms, and being able to be optionally substituted by $C_1$- to $C_4$ alkyl.

Examples of cycloalkanol and bicycloalkanol are cyclopentanol, cyclohexanol, cyclooctanol, cyclododecanol, 4-methylcyclohexanol, 4-isopropylcyclohexanol, 4-tert-butylcyclohexanol (preferably in cis configuration), dihydrodicyclopentadienyl alcohol, isoborneol, and norbornyl alcohol. Preference is given to isoborneol, cyclohexanol, and 4-tert-butylcyclohexanol.

(Meth)acrylates of heterocyclic compounds are monofunctional esters of α,β-ethylenically unsaturated carboxylic acids, preferably of acrylic acid or methacrylic acid, with a monofunctional alcohol which has at least one saturated 5- or 6-membered heterocycle having one or two oxygen atoms in the ring as a structural element.

Examples thereof can be found in WO 2010/121978 A1, page 12 lines 12 37, hereby incorporated by reference to be part of the present disclosure content.

Preferred (meth)acrylates of heterocyclic compounds are trimethylolpropane monoformal acrylate, glycerol monoformal acrylate, 4-tetrahydropyranyl acrylate, 2-tetrahydropyranyl methylacrylate, tetrahydrofurfuryl acrylate, and mixtures thereof.

Application

The coating of the light alloy rims with the coating materials described takes place in accordance with customary methods that are known to the skilled person, in which a coating material or a surface-coating formulation comprising it is applied to the substrate to be coated in the desired thickness and optionally is dried and/or optionally is partly or fully cured. This operation may be repeated one or more times if desired. Application to the substrate may be accomplished in a known way, as for example by dipping, spraying, trowelling, knifecoating, brushing, rolling, rollercoating, pouring, laminating, injection backmolding or coextruding, preferably by dipping or spraying, more preferably by spraying.

The coating compositions may be applied by any of a very wide variety of spraying methods, one or more times, such as air-pressure, airless or electrostatic spraying methods, for example.

The coating thickness is situated generally within a range from about 3 to 1000 g/m² and preferably 10 to 200 g/m².

Application, drying and curing of the coatings take place in general under standard temperature conditions, i.e., without the coating being heated, but may also be applied at elevated temperature (see next paragraph). Alternatively the coating materials may be used for producing coatings which following application are dried and cured at elevated temperature, e.g., at 40-250° C., preferably 40-150° C., and more particularly at 40 to 100° C. This is limited by the thermal stability of the substrate.

In one preferred embodiment the coating material is applied with an elevated temperature, as for example 30 to 80, preferably 40 to 60° C., with the substrate being at a lower temperature. The advantage of this is that the coating material has a lower viscosity on application, as a result of the higher temperature, and the cooling on the substrate enhances the holdout properties (low tendency toward sagging).

Curing

Radiation curing takes place using high-energy light, as for example UV light, or electron beams, preferably UV light. Radiation curing may take place at relatively high temperatures. For example, a temperature above the $T_g$ of the radiation-curable binder may be advisable here.

Radiation curing here means the free-radical polymerization of polymerizable compounds as a consequence of electromagnetic and/or particulate radiation, preferably UV light in the wavelength range of λ=200 to 700 nm and/or electron beams in the range from 150 to 300 keV, and more preferably with a radiation dose of at least 80, preferably 80 to 3000 mJ/cm².

Drying and curing of the coatings take place in general under standard temperature conditions, i.e., without the coating being heated. Alternatively the coating materials may also be used for producing coatings which following application are dried and cured at elevated temperature, e.g., at 40-150° C., preferably 40-100° C., and more particularly at 40 to 80° C.

Further disclosed is a method for coating substrates by applying to the substrate the coating materials described, or surface-coating formulations comprising them, optionally admixed with thermally curable resins, drying the applied coating, and then curing it with electron beams or UV exposure in an oxygen-containing atmosphere or, preferably, under inert gas, optionally at temperatures up to the level of the drying temperature.

It is possible optionally, if two or more layers of the coating composition are applied one above another, to carry out drying and/or radiation curing after each coating operation.

Examples of suitable radiation sources for the radiation cure are low-pressure, medium-pressure, and high-pressure mercury lamps, and also fluorescent tubes, pulsed lamps, metal halide lamps, electronic flash devices which allow radiation curing without a photoinitiator, or excimer emitters. The radiation cure is accomplished by exposure to high-energy radiation, i.e., UV radiation or daylight, preferably light in the wavelength range of λ=200 to 700 nm, more preferably of λ=200 to 500 nm, and very preferably λ=250 to 400 nm, or by bombardment with high-energy electrons (electron beams; 150 to 300 keV). Examples of radiation sources used include high-pressure mercury vapor lamps, lasers, pulsed lamps (flash light), halogen lamps, LED lamps or excimer emitters. The radiation dose normally sufficient for crosslinking in the case of UV curing is situated in the range from 80 to 3000 mJ/cm².

It is of course also possible to use two or more radiation sources for the cure—two to four, for example.

These sources may also each emit in different wavelength ranges.

Since the light alloy rims are covered on all sides with coating materials, at least with the layer (A), curing also takes place from the sides coated.

Irradiation may with preference also be carried out in the absence of oxygen, as under an inert gas atmosphere, for example. Suitable inert gases are preferably nitrogen, noble gases, carbon dioxide, or combustion gases. Irradiation may take place, furthermore, with the coating material covered with transparent media. Examples of transparent media are polymeric films, glass or liquids, water for example. Particular preference is given to irradiation in the manner described in DE-A1 199 57 900.

If curing takes place by means of UV radiation rather than electron beams, then it is self-evident that the radiation-curable coating material comprises in each case at least one photoinitiator which can be activated in a wavelength range of the irradiated radiation, and for which the ingredients present in the coating materials are transparent.

Suitable photoinitiators include those as described in WO 2006/005491 A1, page 21 line 18 to page 22 line 2 (corresponding to US 2006/0009589 A1, paragraph [0150]), hereby incorporated by reference to become part of the present disclosure content.

As an example, an illustration may be given of a method for coating light alloy rims that comprises at least the following steps:
providing a mechanically prepared rim body,
coating the rim body with at least one conversion coating, followed by drying,
coating with at least one coating material which comprises at least one radiation-curable compound and optionally at least one anticorrosion pigment and/or corrosion inhibitor, the coating material having an acid number of 10 to 120 mg KOH/g,
optionally flashing the resultant coating (A1),
coating with at least one coating material which comprises at least one radiation-curable compound and at least one anticorrosion pigment and/or corrosion inhibitor,
subsequently, at least partial curing by radiation, followed by coating with at least one water-based, two-component polyurethane coating material, comprising at least one pigment and/or metallic flakes,
subsequently flashing and drying of the coating, as for example at 60 to 100° C. over a period of 10 to 30 minutes,
coating with at least one radiation-curable coating material comprising at least one radiation-curable compound and optionally one or more typical coatings additives,
followed by complete curing of the surface-coating layers by radiation.

As an example, an illustration may be given of a method for coating light alloy rims that comprises at least the following steps:
providing a mechanically prepared rim body,
coating the rim body with at least one conversion coating, followed by drying,
coating with at least one coating material which comprises at least one radiation-curable compound and optionally at least one anticorrosion pigment and/or corrosion inhibitor, the coating material having an acid number of 10 to 120 mg KOH/g,
optionally flashing the resultant coating (A1),
coating with at least one coating material which comprises at least one radiation-curable compound and at least one anticorrosion pigment and/or corrosion inhibitor,
subsequently, at least partial curing by radiation, followed by coating with at least one water-based, radiation-curable coating material, comprising at least one pigment and/or metallic flakes,
subsequently, at least partial curing by radiation,
coating with at least one radiation-curable coating material comprising at least one radiation-curable compound and optionally one or more typical coatings additives,
followed by complete curing of the surface-coating layers by radiation.

EXAMPLES

Example 1

Adhesion Primer A1 (1st Layer Directly on Substrate)

| Trade name | Chemical description | Proportion in the formulation [%] | Component | Function in the formulation |
|---|---|---|---|---|
| | Difunctional aliphatic urethane acrylate, having a molecular weight of about 1500 g/mol, diluted in trimethylolpropane formal monoacrylate | 28.0 | A1a | Binder for film forming |
| | 4-tert-Butylcyclohexyl acrylate | 39.0 | A1b | Low-shrink reactive diluent |
| | Preparation based on: 2-(phosphonooxy)ethyl methacrylate, bis(methacryloyloxyethyl)hydrogenphosphate | 10.0 | A1b | Acidic adhesion promoter |
| Lugalvan ® BPC 48 | 1-Benzyl-3-carboxylatopyridinium | 1.0 | A1c | Corrosion inhibitor |
| Shieldex ® C303 | Synthetic, amorphous silicon dioxide - exchanged with calcium ions | 14.0 | A1c | Anticorrosion pigment |
| Kronos ® 2310 | Titanium dioxide | 3.5 | | White pigment for coloring |
| Flammruβ 101 | Carbon black | 0.1 | | Black pigment for coloring |
| Talkum IT extra | Magnesium silicate hydrate | 2.0 | | Filler |

-continued

| Trade name | Chemical description | Proportion in the formulation [%] | Component | Function in the formulation |
|---|---|---|---|---|
| Irgacure ® 184 | α-Hydroxy ketone | 2.0 | | Photoinitiator |
| Irgacure ® 819 | Acylphosphine oxide | 0.4 | | Photoinitiator |

The formulation has an acid number of about 30 mg KOH/g.

Example 2

Adhesion Primer A1 (1st Layer Directly on Substrate)

| Trade name | Chemical description | Proportion in the formulation [%] | Component | Function in the formulation |
|---|---|---|---|---|
| | Bisphenol A diglycidyl ether diacrylate (55%), diluted with a) Versatic acid glycidyl ester acrylate (15%) b) dipropylene glycol diacrylate (30%) | 28.0 | A1a | Binder for film forming |
| | Trimethylolpropane formal monoacrylate | 39.0 | A1b | Low-shrink reactive diluent |
| | Preparation based on: 2-(phosphonooxy)ethyl methacrylate, bis(methacryloyloxyethyl)hydrogenphosphate | 10.0 | A1b | Acidic adhesion promoter |
| Halox ® 650 | | 1.0 | A1c | Corrosion inhibitor |
| Shieldex ® C303 | Synthetic, amorphous silicon dioxide - exchanged with calcium ions | 14.0 | A1c | Anticorrosion pigment |
| Kronos ® 2310 | Titanium dioxide | 3.5 | | White pigment for coloring |
| Flammruβ 101 | Carbon black | 0.1 | | Black pigment for coloring |
| Talkum IT extra | Magnesium silicate hydrate | 2.0 | | Filler |
| Irgacure ® 184 | α-Hydroxy ketone | 2.0 | | Photoinitiator |
| Irgacure ® 819 | Acylphosphine oxide | 0.4 | | Photoinitiator |

The formulation has an acid number of about 30 mg KOH/g.

Example 3

Primer A2 (2$^{nd}$ Layer)

| Trade name | Chemical description | Proportion in the formulation [%] | Component | Function in the formulation |
|---|---|---|---|---|
| | Difunctional, elastic, aliphatic urethane acrylate, having a molecular weight of about 1500 g/mol, diluted in trimethylolpropane formal monoacrylate | 19.0 | A2a | Binder for film forming |

-continued

| Trade name | Chemical description | Proportion in the formulation [%] | Component | Function in the formulation |
|---|---|---|---|---|
| | Trifunctional aliphatic urethane acrylate having a molecular weight of about 800 g/mol, diluted in HDDA | 38.0 | A2a | Binder for film forming |
| Laromer ® LR 9000 | Radiation-curing, polymeric, acrylate-modified isocyanate | 10.0 | A2a | Dual-cure resin for improving interlayer adhesion |
| Laromer ® HDDA | Hexanediol diacrylate | 11.0 | A2b | Difunctional reactive diluent |
| Laromer ® TMPTA | Trimethylolpropane triacrylate | 10.0 | A2b | Trifunctional reactive diluent |
| Byk ® 361 | Acrylate copolymer | 0.2 | | Flow control additive |
| Byk ® 020 | Polysiloxane solution | 0.2 | | Defoamer |
| Kronos ® 2310 | Titanium dioxide | 2.1 | | White pigment for coloring |
| Flammruβ 101 | Carbon black | 0.1 | | Black pigment for coloring |
| Talkum IT extra | Magnesium silicate hydrate | 6.0 | | Filler |
| Tinuvin ® 292 | N-Alkyl-HALS | 1.0 | | Light stabilizer |
| Irgacure ® 184 | α-Hydroxy ketone | 1.0 | | Photoinitiator |
| Irgacure ® 819 | Acylphosphine oxide | 1.4 | | Photoinitiator |

Example 4

Clear Coat C: (4th Layer)

| Trade name | Chemical description | Proportion in the formulation [%] | Component | Function in the formulation |
|---|---|---|---|---|
| | Difunctional elastic, aliphatic urethane acrylate having a molecular weight of about 1500, diluted in trimethylolpropane formal monoacrylate | 28.7 | C1 | Binder for film forming |
| | Trifunctional aliphatic urethane acrylate having a molecular weight of about 800 g/mol, diluted in HDDA | 44.4 | C1 | Binder for film forming |
| | Hexanediol diacrylate | 21.3 | C2 | Difunctional reactive diluent |
| Byk ® 361 | Acrylate copolymer | 0.2 | C3 | Flow control additive |
| Tinuvin ® 400 | Hydroxyphenyltriazine | 1.5 | C3 | Light stabilizer |
| Tinuvin ® 292 | N-Alkyl-HALS | 0.9 | C3 | Light stabilizer |
| Irgacure ® 184 | α-Hydroxy ketone | 2.5 | | Photoinitiator |
| Lucirin ® TPO | Acylphosphine oxide | 0.5 | | Photoinitiator |

Formulations (A1) and (A2) were applied to cast aluminum test castings measuring about 8×12 cm by pneumatic spraying using a hot spray gun at about 70° C. in a wet film thickness of about 50-70 μm.

After about 1 minute, formulation (A1) was irradiated and cured at a belt speed of 10 m/min and at a distance of about 10 cm with a medium-pressure mercury lamp (160 W/cm) and also with a Ga-doped medium-pressure mercury lamp (160 W/cm) under a nitrogen atmosphere (residual oxygen content <5000 ppm). Formulation (A2) was then also irradiated and cured in the same way.

Formulation (B) was applied by pneumatic spraying at room temperature and dried physically at 60° C. for 10 minutes.

Like formulations (A1) and (A2), formulation (C) was applied pneumatically using a hot spray gun and, after about 1 minute, was irradiated and cured at a belt speed of 5 m/min and at a distance of about 10 cm with a medium-pressure mercury lamp (160 W/cm) and also with a Ga-doped medium-pressure mercury lamp (160 W/cm) under a nitrogen atmosphere (residual oxygen content <5000 ppm).

After storage for about 7 days at 21° C. and 50% relative humidity, the coatings tests were conducted, and gave the following results:

CASS test:
DIN EN 4628-8 subfilm corrosion—0.9 mm
DIN EN 4628-3 surface rust—Ri0
DIN EN 4628-2 blistering/degree of blisters—0 S0
Cross-cut DIN EN ISO 2409—Gt1
Multistone impact DIN EN ISO 12567-1, method B—characteristic value 1.0

What is claimed is:

1. A method for coating light alloy rims with at least four layers comprising a first primer layer (A1), a second primer layer (A2), a base coat layer (B), and a clear coat layer (C), each layer being of different coating materials, the method comprising
   providing a substrate comprising a machined light alloy rim blank comprising a cast aluminum alloy;
   applying the first primer layer (A1) directly to the substrate, the first primer layer (A1) comprising at least one radiation-curable coating material having an acid number in accordance with DIN EN ISO 3682 (by potentiometry) of 10 to 120 mg KOH/g;
   applying the second primer layer (A2);
   applying the base coat layer (B);
   applying the clear coat layer (C) to the machined light alloy rim blank, the clear coat layer (C) comprising a radiation-curable clear coat layer having at least 1 mol of free-radically polymerizabie double-bond reactive groups per kg of coating material; and
   curing the layers of different coating materials by radiation.

2. The method of claim 1, wherein each applied layer, is only dried and optionally is subjected to not more than partial curing prior to full curing of all applied layers.

3. The method of claim 1, wherein the second primer layer (A2)
   comprises at least one radiation-curable coating material comprising at least one binder (A2a) selected from the group consisting of aliphatic urethane (meth)acrylates, aromatic urethane (meth)acrylates, and epoxy (meth)acrylates;
   at least one reactive diluent (A2b); and
   at least one anticorrosion pigment and/or corrosion inhibitor (A2c).

4. The method of claim 1, wherein the basecoat layer (B) comprises at least one water-based, two-component coating material comprising at least one pigment and/or metallic flakes.

5. The method of claim 1, wherein the basecoat layer (B) comprises at least one water-based, radiation-curable coating material comprising at least one pigment and/or metallic flakes.

6. The method of claim 4, wherein the coating material for the basecoat layer (B) has a solids content of between 20% and 80% by weight.

7. The method of claim 1, wherein the curing of the radiation-curable coating materials is carried out under inert gas.

8. The method of claim 1, wherein prior to application of the clear coat layer (C), the cured basecoat layer (B) is removed on a outer facing side of the machined light alloy rim blank down to a bare metal, and the clear coat layer (C) is applied to the bare metal.

9. The method of claim 5, wherein the coating material for the basecoat layer (B) has a solids content of between 20% and 80% by weight.

* * * * *